(12) United States Patent
Bradfield

(10) Patent No.: US 6,278,213 B1
(45) Date of Patent: Aug. 21, 2001

(54) HIGH FILL STATOR DESIGN

(75) Inventor: Michael Duane Bradfield, Anderson, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/482,234

(22) Filed: Jan. 13, 2000

(51) Int. Cl.$^7$ ............................... H02K 1/00; H02K 1/04

(52) U.S. Cl. ........................................... 310/216; 310/201

(58) Field of Search ..................................... 310/216, 201, 310/261; 29/596–598

(56) References Cited

U.S. PATENT DOCUMENTS

| | | | |
|---|---|---|---|
| 2,407,935 | * | 9/1946 | Perfetti et al. ........................ 310/216 |
| 3,860,744 | * | 1/1975 | Schuler ........................... 174/117 FF |
| 4,613,780 | * | 9/1986 | Fritzsche ............................... 310/216 |
| 5,587,619 | * | 12/1996 | Yumiyama et al. .................. 310/201 |

* cited by examiner

*Primary Examiner*—Tran Nguyen
(74) *Attorney, Agent, or Firm*—Margaret A. Dobrowitsky

(57) ABSTRACT

A high fill rigid stator winding and core design for use in generators. The stator design consists of a plurality of stator teeth with slots between the teeth. Flattened magnet wire with rounded edges is stacked in the slots. The slots are angled slightly to produce a wedging effect to keep the wire in the slots.

14 Claims, 2 Drawing Sheets

HIGH FILL STATOR DESIGN

TECHNICAL FIELD

The present invention relates to the stator winding and core design of an electrical machine.

BACKGROUND OF THE INVENTION

Generators are found in virtually every motor vehicle manufactured today. These generators, such as the common Lundell generator, produce alternating current to meet the vehicle's electrical needs. While the engine of the vehicle is running, the generator produces sufficient electricity to supply the vehicle's electrical demands and to recharge the battery.

An important component of the generator is the stator. In most generators, the stator contains the main current-carrying winding in which electromotive force produced by magnetic flux is induced. Typically, the current-carrying winding consists of conducting wire, which is wound and inserted into the slots of the stator. Each slot is located between two teeth. The wire is wound and inserted into slots in the stator in bundles. The prior art teaches the winding and insertion of wire having a rounded profile. This rounded wire, however, has several disadvantages associated with its use in a conventional stator.

First, the bundles of rounded wire do not occupy the stator slots in an efficient manner. Typically, the ratio of copper wire area to total slot area is 50%. This conventional design produces a lower output current and is less efficient electrically than a design in which the wire occupies a higher ratio of the slot.

Second, in a conventional stator design, two features are used to retain the wire in the slot: tooth tips and wedges. The teeth of the conventional stator are widened at the bottom of the slot to make the slot correspondingly narrower. In addition, a paper wedge typically is inserted into the slot after the bundle of wire has been inserted. Insertion of the wedge is a significant problem in the manufacturing area, and the process of insertion raises cost by increasing equipment down time and maintenance.

Third, the conventional stator design does not permit efficient stamping of the stator core. The stamping of a conventional stator core lamination according to the prior art produces a significant amount of scrap. This low material utilization results because the conventional stator design uses widened tooth tips.

Fourth, the use of rounded wire in the conventional stator design results in poor heat conduction because the wire is loosely bundled in the slot. This poor heat conduction results in higher stator wire temperatures. In turn, this higher temperature decreases the reliability, performance, and efficiency of the wire.

SUMMARY OF THE INVENTION

It is an object of the present invention to provide a solution to the above mentioned problems. A stator constructed in accordance with the present invention is characterized by the features specified the section of Detailed Description of the Preferred Embodiments. The present invention is a high fill stator design. This new design is furthered by the fact that flattened magnet wire is now widely available for use in stators. Flattened magnet copper wire is now available with a height to width ratio of up to 4 to 1 with the ends of the wire rounded. Use of flattened magnet wire allows redesign of the stator to overcome the disadvantages of wire having a rounded profile.

The present invention uses flattened magnet wire that is wound and inserted into the stator slots. The flattened magnet wire is stacked into the stator slots. In addition, the slots of the present invention are angled so that the flattened wire fits loosely at the top of each slot but fits tightly at the bottom. This angling retains the wire in each slot.

The use of flattened magnet wire and the corresponding new core design overcome the disadvantages of the prior art. First, the stacked flattened wire utilizes nearly 80% of the slot area. The use of flattened wire also produces a correspondingly higher output current and is more efficient than the use of wire with a rounded profile. Second, the self-retaining nature of the invention eliminates the need for a paper wedge or tooth tips, reducing cost. Third, the geometry of the new core design produces less scrap during the stamping of the stator core lamination. Fourth, the flattened wire and core design improve heat conduction, resulting in lower wire temperatures and a corresponding increase in reliability, performance, and efficiency. The new core design has an additional advantage. The use of stacked flattened wire in the new design stiffens the stator teeth in the radial direction, reducing vibration and noise.

BRIEF DESCRIPTION OF THE DRAWINGS

The present invention will now be described, by way of example, with reference to the accompanying drawings, in which.

DETAILED DESCRIPTION OF AN EMBODIMENT OF THE INVENTION

Figure 1:
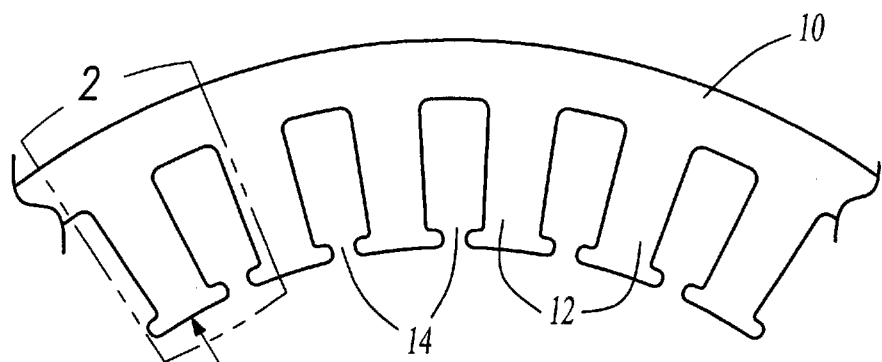
FIG. 1 is a an enlarged view of a conventional stator.
Figure 2:
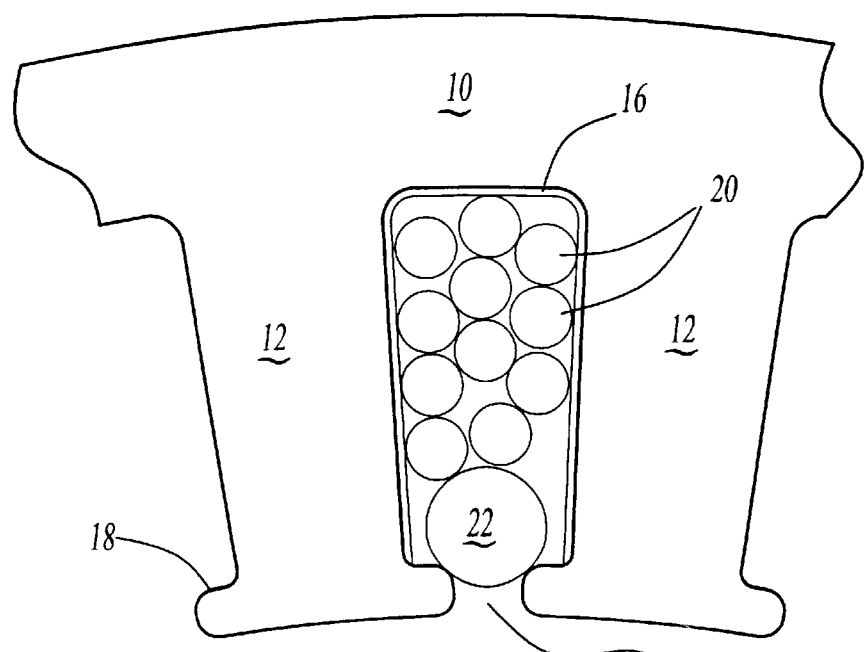
FIG. 2 is a partial cross-sectional view of a conventional stator, corresponding to the circled portion shown in FIG. 1.

FIGS. 1 and 2 illustrate a conventional stator. In FIG. 1, the stator consists of a yoke (10), a plurality of teeth (12), and a plurality of slots (14). As shown in FIG. 2, each slot is located between two teeth, and the slots typically each contain slot liners (16) along the insides of the slots. Each tooth has a tooth tip (18) at the bottom of the slot that is wider than the tooth itself. FIG. 2 also shows a cross-sectional view of a loosely-packed bundle of rounded magnet wire (20) that occupies the slot. The rounded wire is retained in the slot by the tooth tips and by a wedge (22).

Figure 3:
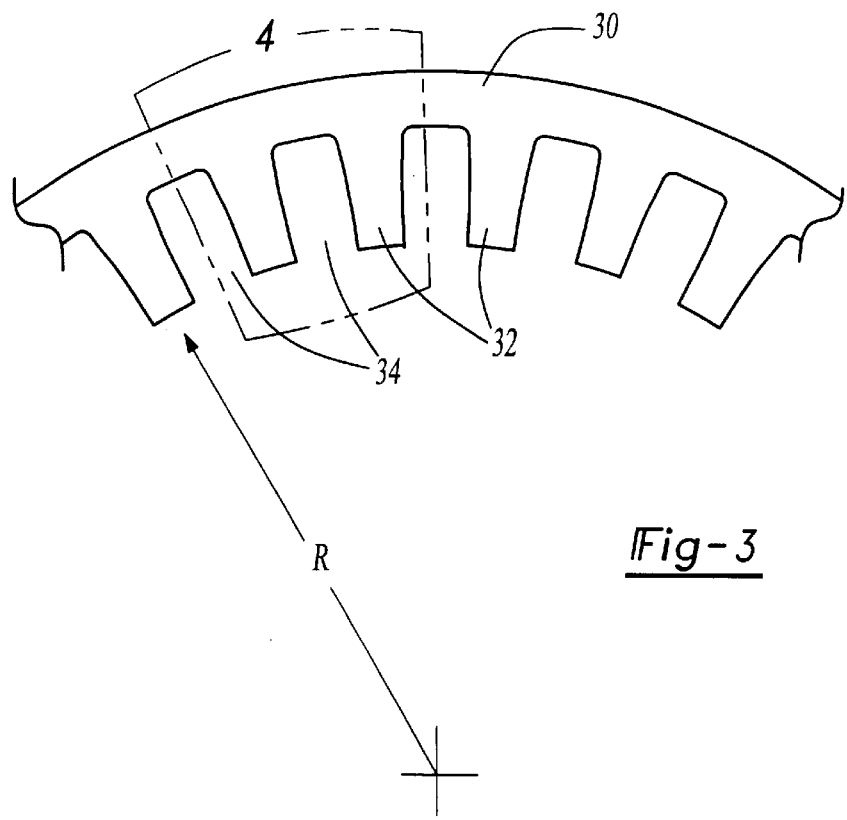
FIG. 3 is an enlarged view showing the stator design of the present invention.
Figure 4:
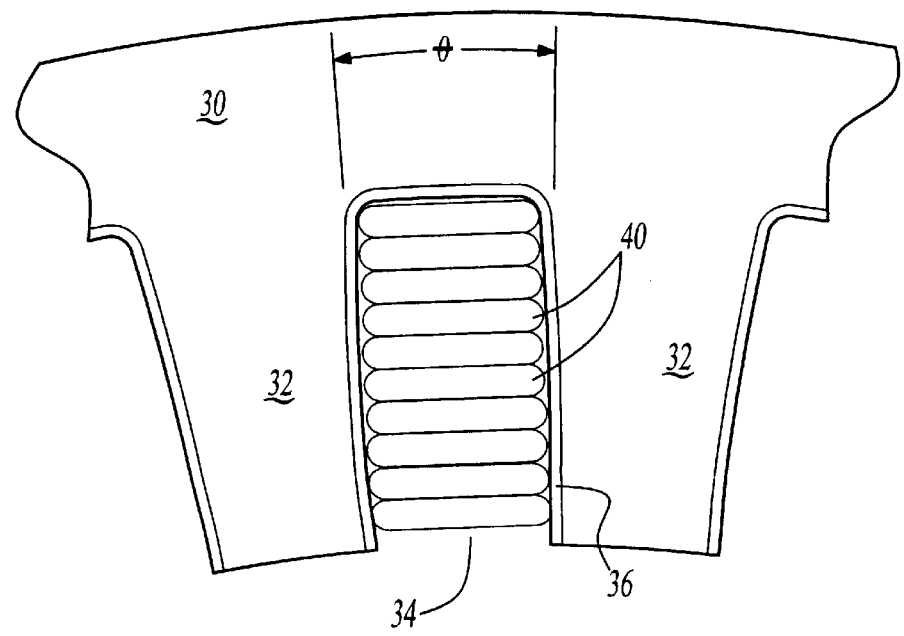
FIG. 4 is a partial cross-sectional view showing the stator design of the present invention, corresponding to the circled portion shown in FIG. 3.

FIGS. 3 and 4 illustrate the stator design of the present invention. Again, as shown in FIG. 3, the stator consists of a yoke (30), a plurality of teeth (32), and a plurality of slots (34). As shown in FIG. 4, each slot is again located between two teeth, and the slots each contain slot liners (36) along the insides of the slots. In the present invention, unlike the prior art, however, each tooth does not have a tooth tip, and the slots do not require a wedge. Each slot is constructed so that the sides of the slot are not parallel but instead form a small angle. The preferred angle is 2 degrees, but any appropriate angle may be used. Flattened wire with rounded edges (40) is stacked in each slot, the flattened or non-circular cross section of the wire enhancing the wedging effect of the present invention. The top of the slot is (the top being the end nearest the yolk) slightly wider than the bottom of the slot, and the wire near the top of the slot fits more loosely in the slot than the wire near the bottom. The slight angling of the stator teeth and slots produces a wedging effect at the bottom of the slot that provides a compressive force to hold the wire in place. In the embodiment shown, only one stator winding wire or conductor fits within the slot per winding layer due to the width of the slot.

The present invention has been described in an illustrative manner. It should be evident that modifications may be made to the specific embodiment described herein without departing from the spirit of the present invention. Such modifications are considered to be within the scope of the present invention, which is limited solely by the cope and spirit of the appended claims.

I claim:

1. A stator for an electrical machine comprising:

a yoke;

a plurality of teeth wherein each tooth being configure without a circumferential-extended tooth tip; and a plurality of slots; said slots formed by pairs of adjacent teeth, each slot having a top adjacent to said yoke, two sides, and an open bottom, a plurality of said slots in which said sides of said slots are at an angle to each other, said open bottom having a width selected to admit only one substantially flattened stator conducting wire therethrough, said width of said bottom being substantially the same as the width of the slot.

2. The stator of claim 1 wherein all slots have the same shape.

3. The stator of claim 1 further comprising a slot liner in each slot.

4. The stator of claim 1 wherein said slots contain a portion of a stator winding.

5. The stator of claim 1 wherein the width of each slot is selected so as to contain only one stator winding conductor.

6. The stator of claim 1 wherein said angle is two degrees.

7. The stator of claim 1 further comprising flattened conducting wire in said slots.

8. The stator of claim 1 further comprising stacked non-circular conducting wire in said slots.

9. An alternating current generator comprising a stator assembly having a stator winding comprising winding layers with conducting wires, the stator having a stator core comprising:

a yoke;

a plurality of teeth wherein each tooth being configure without a circumferential-extended tooth tip;

a plurality of slots, each slot located between adjacent teeth and each slot having a top adjacent to the yoke, two sides, and an open bottom; wherein the sides of the slots are not parallel so that the top of each slot is wider than the bottom of the slot said open bottom having a width selected to admit only one substantially flattened conducting wire, said width of said bottom being substantially the same as the width of the slot.

10. The generator of claim 9 further comprising a stator winding held in place within said slots due to a wedging action caused by the sides of the slot.

11. The generator of claim 10 further comprising a stator winding having a plurality of layers of conducting wires and wherein the width of said slots is such that only one stator winding conducting wire can fit within the slot per winding layer.

12. The generator of claim 10 further comprising a stator winding having a plurality of layers of conducting wires wherein said wires are stacked.

13. The generator of claim 10 further comprising a stator winding having a plurality of layers of conducting wires wherein said wires are flattened.

14. The generator of claim 10 further comprising a stator winding having a plurality of layers of conducting wires wherein said wires are noncircular in cross section.

* * * * *